United States Patent
Wang et al.

(10) Patent No.: US 8,886,651 B1
(45) Date of Patent: *Nov. 11, 2014

(54) THEMATIC CLUSTERING

(75) Inventors: Sherman Wang, Sunnyvale, CA (US); Thomas Gerardo Dignan, Mountain View, CA (US)

(73) Assignee: Reputation.com, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/335,665

(22) Filed: Dec. 22, 2011

(51) Int. Cl.
*G06F 17/30* (2006.01)

(52) U.S. Cl.
USPC .................. 707/738; 707/740; 706/45; 704/1

(58) Field of Classification Search
CPC .......... G06F 17/30; Y10S 707/99; G06K 9/62
USPC ............. 707/737, 999.101, 739, 741; 706/45, 706/12, 48; 1/1; 704/2, 9, 235
See application file for complete search history.

(56) References Cited

U.S. PATENT DOCUMENTS

| | | | |
|---|---|---|---|
| 5,819,258 | A | 10/1998 | Vaithyanathan et al. |
| 5,857,179 | A | 1/1999 | Vaithyanathan et al. |
| 5,873,081 | A | 2/1999 | Harel |
| 5,987,457 | A | 11/1999 | Ballard |
| 6,006,218 | A | 12/1999 | Breese et al. |
| 6,178,419 | B1 | 1/2001 | Legh-Smith et al. |
| 6,182,066 | B1 | 1/2001 | Marques |
| 6,324,650 | B1 | 11/2001 | Ogilvie |
| 6,374,251 | B1 * | 4/2002 | Fayyad et al. .......................... 1/1 |
| 6,484,068 | B1 | 11/2002 | Yamamoto et al. |
| 6,510,432 | B1 | 1/2003 | Doyle |
| 6,513,031 | B1 | 1/2003 | Fries et al. |
| 6,532,459 | B1 | 3/2003 | Berson |
| 6,611,825 | B1 * | 8/2003 | Billheimer et al. ............. 706/45 |
| 6,678,690 | B2 | 1/2004 | Kobayashi et al. |
| 6,701,305 | B1 * | 3/2004 | Holt et al. ........................ 706/45 |
| 6,766,316 | B2 | 7/2004 | Caudill et al. |
| 6,775,677 | B1 | 8/2004 | Ando et al. |
| 6,968,333 | B2 | 11/2005 | Abbott et al. |
| 6,985,896 | B1 | 1/2006 | Perttunen |

(Continued)

FOREIGN PATENT DOCUMENTS

WO    WO0146868    6/2001

OTHER PUBLICATIONS

Liu et al., "Personalized Web Search by Mapping User Queries to Categories," CIKM, '02, McLean, Virginia, Nov. 4-6, 2002, pp. 558-565.

(Continued)

*Primary Examiner* — Dennis Truong
(74) *Attorney, Agent, or Firm* — Van Pelt, Yi & James LLP

(57) ABSTRACT

A data set is clustered into one or more initial clusters using a first term space. Initial themes for the initial clusters are determined. The first term space is reduced to create a reduced term space. At least a portion of the data set is reclustered into one or more baby clusters using the reduced term space. One or more singletons are reassigned to form one or more renovated clusters from the baby clusters. A renovated theme is determined for at least some of the renovated clusters. One or more of the renovated clusters and their respective themes are provided as output.

20 Claims, 10 Drawing Sheets

(56) References Cited

U.S. PATENT DOCUMENTS

| | | | |
|---|---|---|---|
| 7,028,026 B1 | 4/2006 | Yang et al. | |
| 7,076,558 B1 | 7/2006 | Dunn | |
| 7,117,207 B1 | 10/2006 | Kerschberg et al. | |
| 7,289,971 B1 | 10/2007 | O'Neil et al. | |
| 7,631,032 B1 | 12/2009 | Refuah et al. | |
| 7,634,810 B2 | 12/2009 | Goodman et al. | |
| 7,640,434 B2 | 12/2009 | Lee et al. | |
| 7,653,646 B2 | 1/2010 | Horn et al. | |
| 7,792,816 B2 | 9/2010 | Funes et al. | |
| 7,970,872 B2 | 6/2011 | Liu et al. | |
| 8,185,531 B2 | 5/2012 | Nakano | |
| 2002/0016910 A1 | 2/2002 | Wright et al. | |
| 2002/0026456 A1* | 2/2002 | Bradford | 707/500 |
| 2002/0111847 A1 | 8/2002 | Smith | |
| 2002/0174230 A1 | 11/2002 | Gudorf et al. | |
| 2002/0178381 A1 | 11/2002 | Lee et al. | |
| 2003/0014402 A1 | 1/2003 | Sealand et al. | |
| 2003/0014633 A1 | 1/2003 | Gruber | |
| 2003/0069874 A1 | 4/2003 | Hertzog et al. | |
| 2003/0093260 A1 | 5/2003 | Dagtas et al. | |
| 2003/0135725 A1 | 7/2003 | Schirmer et al. | |
| 2003/0147536 A1 | 8/2003 | Andivahis et al. | |
| 2003/0229668 A1 | 12/2003 | Malik | |
| 2004/0019584 A1 | 1/2004 | Greening et al. | |
| 2004/0019846 A1 | 1/2004 | Castellani et al. | |
| 2004/0024598 A1* | 2/2004 | Srivastava et al. | 704/235 |
| 2004/0063111 A1 | 4/2004 | Shiba et al. | |
| 2004/0064438 A1 | 4/2004 | Kostoff | |
| 2004/0078363 A1 | 4/2004 | Kawatani | |
| 2004/0082839 A1 | 4/2004 | Haugen | |
| 2004/0088308 A1 | 5/2004 | Bailey et al. | |
| 2004/0093414 A1 | 5/2004 | Orton | |
| 2004/0122926 A1 | 6/2004 | Moore et al. | |
| 2004/0169678 A1 | 9/2004 | Oliver | |
| 2004/0205457 A1* | 10/2004 | Bent et al. | 715/500 |
| 2004/0220944 A1* | 11/2004 | Behrens et al. | 707/100 |
| 2004/0230577 A1* | 11/2004 | Kawatani | 707/6 |
| 2004/0267717 A1 | 12/2004 | Slackman | |
| 2005/0005168 A1 | 1/2005 | Dick | |
| 2005/0050009 A1 | 3/2005 | Gardner et al. | |
| 2005/0071632 A1 | 3/2005 | Pauker et al. | |
| 2005/0114313 A1 | 5/2005 | Campbell et al. | |
| 2005/0160062 A1 | 7/2005 | Howard et al. | |
| 2005/0165736 A1 | 7/2005 | Oosta | |
| 2005/0177559 A1 | 8/2005 | Nemoto | |
| 2005/0216443 A1 | 9/2005 | Morton et al. | |
| 2005/0234877 A1 | 10/2005 | Yu | |
| 2005/0251536 A1 | 11/2005 | Harik | |
| 2005/0256866 A1 | 11/2005 | Lu et al. | |
| 2006/0004716 A1 | 1/2006 | Hurst-Hiller et al. | |
| 2006/0015942 A1 | 1/2006 | Judge et al. | |
| 2006/0026593 A1 | 2/2006 | Canning et al. | |
| 2006/0042483 A1 | 3/2006 | Work et al. | |
| 2006/0047725 A1 | 3/2006 | Bramson | |
| 2006/0116896 A1 | 6/2006 | Fowler et al. | |
| 2006/0149708 A1 | 7/2006 | Lavine | |
| 2006/0152504 A1 | 7/2006 | Levy | |
| 2006/0161524 A1 | 7/2006 | Roy et al. | |
| 2006/0173828 A1 | 8/2006 | Rosenberg | |
| 2006/0174343 A1 | 8/2006 | Duthie et al. | |
| 2006/0212931 A1 | 9/2006 | Shull et al. | |
| 2006/0218140 A1* | 9/2006 | Whitney et al. | 707/5 |
| 2006/0242190 A1* | 10/2006 | Wnek | 707/102 |
| 2006/0253423 A1 | 11/2006 | McLane et al. | |
| 2006/0253458 A1 | 11/2006 | Dixon et al. | |
| 2006/0253578 A1 | 11/2006 | Dixon et al. | |
| 2006/0253580 A1 | 11/2006 | Dixon et al. | |
| 2006/0253582 A1 | 11/2006 | Dixon et al. | |
| 2006/0253583 A1 | 11/2006 | Dixon et al. | |
| 2006/0253584 A1 | 11/2006 | Dixon et al. | |
| 2006/0271524 A1 | 11/2006 | Tanne et al. | |
| 2006/0287980 A1 | 12/2006 | Liu et al. | |
| 2006/0294085 A1 | 12/2006 | Rose et al. | |
| 2006/0294086 A1 | 12/2006 | Rose et al. | |
| 2007/0073660 A1 | 3/2007 | Quinlan | |
| 2007/0101419 A1 | 5/2007 | Dawson | |
| 2007/0112760 A1 | 5/2007 | Chea et al. | |
| 2007/0112761 A1 | 5/2007 | Xu et al. | |
| 2007/0118518 A1* | 5/2007 | Wu et al. | 707/5 |
| 2007/0121596 A1 | 5/2007 | Kurapati et al. | |
| 2007/0124297 A1 | 5/2007 | Toebes | |
| 2007/0130126 A1 | 6/2007 | Lucovsky et al. | |
| 2007/0150562 A1 | 6/2007 | Stull et al. | |
| 2007/0156665 A1* | 7/2007 | Wnek | 707/4 |
| 2007/0271287 A1* | 11/2007 | Acharya et al. | 707/101 |
| 2007/0271292 A1* | 11/2007 | Acharya et al. | 707/102 |
| 2007/0288468 A1 | 12/2007 | Sundaresan et al. | |
| 2008/0021890 A1 | 1/2008 | Adelman et al. | |
| 2008/0077517 A1 | 3/2008 | Sappington | |
| 2008/0077577 A1 | 3/2008 | Byrne et al. | |
| 2008/0082687 A1 | 4/2008 | Cradick et al. | |
| 2008/0104030 A1 | 5/2008 | Choi et al. | |
| 2008/0109245 A1 | 5/2008 | Gupta | |
| 2008/0109491 A1 | 5/2008 | Gupta | |
| 2008/0133488 A1 | 6/2008 | Bandaru et al. | |
| 2008/0165972 A1 | 7/2008 | Worthington | |
| 2008/0168019 A1* | 7/2008 | Dakka et al. | 706/48 |
| 2008/0281807 A1 | 11/2008 | Bartlang et al. | |
| 2008/0288277 A1 | 11/2008 | Fasciano | |
| 2008/0294686 A1* | 11/2008 | Long et al. | 707/103 R |
| 2009/0070325 A1 | 3/2009 | Gabriel et al. | |
| 2009/0210406 A1* | 8/2009 | Freire et al. | 707/5 |
| 2009/0307762 A1 | 12/2009 | Cudd, Jr. | |
| 2010/0100950 A1 | 4/2010 | Roberts | |
| 2010/0114561 A1* | 5/2010 | Yasin | 704/9 |
| 2010/0174670 A1* | 7/2010 | Malik et al. | 706/12 |
| 2010/0198839 A1 | 8/2010 | Basu et al. | |
| 2010/0250515 A1 | 9/2010 | Ozonat et al. | |
| 2010/0262454 A1 | 10/2010 | Sommer et al. | |
| 2010/0262601 A1 | 10/2010 | Dumon et al. | |
| 2010/0268526 A1* | 10/2010 | Bradford | 704/2 |
| 2010/0313252 A1 | 12/2010 | Trouw | |
| 2011/0016118 A1 | 1/2011 | Edala et al. | |
| 2011/0022597 A1* | 1/2011 | Gallivan et al. | 707/738 |
| 2011/0078049 A1 | 3/2011 | Rehman et al. | |
| 2011/0087668 A1* | 4/2011 | Thomas et al. | 707/738 |
| 2011/0112901 A1 | 5/2011 | Fried et al. | |
| 2011/0153551 A1 | 6/2011 | Gabriel et al. | |
| 2011/0296179 A1 | 12/2011 | Templin et al. | |
| 2012/0023332 A1 | 1/2012 | Gorodyansky | |
| 2012/0209847 A1* | 8/2012 | Rangan | 707/737 |
| 2013/0007014 A1 | 1/2013 | Fertik et al. | |
| 2013/0124653 A1 | 5/2013 | Vick et al. | |

OTHER PUBLICATIONS

PCT Notification of Transmittal of the International Search Report and the Written Opinion of the International Searching Authority for International Application No. PCT/US2012/044668, dated Dec. 21, 2012, 11pages.

Pretschner et al., "Ontology Based Personalized Search," Proc. 11th IEEE International Conference on Tools with Artificial Intelligence, Chicago, Illinois, Nov. 1999, pp. 391-398.

Sugiyama et al., "Adaptive Web Search Based on User Profile Constructed Without Any Effort from Users," ACM, New York, NY, May 17-22, 2004, pp. 675-684.

Xiaoyan et al., "Simultaneous Clustering and Noise Detection for Theme-based Sumarization", http://aclweb.org/anthology/I/I11/I11-1055.pdf, Oct. 28, 2011.

Farahat et al., "Enhancing Document Clustering Using Hybrid Models for Semantic Similarity", http://web.eecs.utk.edu/events/tmw10/slides/Farahat.pdf, 2010.

PCT Notification of Transmittal of the International Search Report and the Written Opinion of the International Searching Authority for International Application No. PCT/US2012/043392, mailed Jan. 25, 2013, 10 pages.

Daranyi et al., Svensk Biblioteksforskning; Automated Text Categorization of Bibliographic Records; Boras Academic Digital Archieve (BADA); artice peer reviewed [on-line], Hogskolan I Boras, vol. 16, Issue 2, pp. 1-14 as paginated or 16-29 as unpaginated of 47 pages, 2007 [retrieved on Nov. 6, 2012].

* cited by examiner

Astronomy: C1=(d1,d2,d3,d4,d5) ⟵ 502
Hollywood: C2=(d6,d7,d8,d9,d10) ⟵ 504
Music: C3=(d16,d17,d18,d19,d20)
Sports: C4=(d21,d22,d23,d24,d25)
Singletons: d11,d12,d13,d14,d15

C1 = (d1, d2, d3, d4, d5)
C2 = (d6, d7, d8, d9, d10)
C3 = (d14, d16, d17, d18, d19)
C4 = (d20, d22, d23, d24, d25)
Singletons: d11, d12, d13, d15, d21.

FIG. 9B

Cluster # 1 has 5 docs: doc_1 doc_2 doc_3 doc_4 doc_5
The following 10 terms are top shared terms:
'star' 'space' 'giant' 'galaxi' 'telescop' 'sun' 'time' 'form' 'univers' 'case'
Cluster # 2 has 5 docs: doc_6 doc_7 doc_8 doc_9 doc_10
The following 10 terms are top shared terms:
'star' 'movi' 'film' 'hollywood' 'legend' 'screen' 'walk' 'actor' 'jame' 'simmon'
Cluster # 3 has 5 docs: doc_14 doc_16 doc_17 doc_18 doc_19
The following 10 terms are top shared terms:
'music' 'countri' 'folk' 'pop' 'song' 'top' 'star' 'artist' 'symbol' 'singer'
Cluster # 4 has 5 docs: doc_20 doc_22 doc_23 doc_24 doc_25
The following 10 terms are top shared terms:
'team' 'game' 'player' 'johnson' 'star' 'john' 'william' 'robert' 'jame' 'richard'

FIG. 9C

THEMATIC CLUSTERING

BACKGROUND OF THE INVENTION

Information has traditionally been manually classified to aid potential readers in locating works of interest. For example, books are typically associated with categorization information (e.g., one or more Library of Congress classifications) and academic articles sometimes bear a list of keywords selected by their authors or editors. Unfortunately, while manual classification may be routinely performed for certain types of information such as books and academic papers, it is not performed (and may not be feasibly performed) for other types of information, such as the predominantly unstructured data found on the World Wide Web.

Attempts to automatically classify documents can also be problematic. For example, one technique for document classification is to designate as the topic of a given document the term occurring most frequently in that document. A problem with this approach is that in some cases, the most frequently occurring term in a document is not a meaningful description of the document itself. Another problem with this approach is that terms can have ambiguous meanings. For example, documents about Panthera onca, the British luxury car manufacturer, and the operating system might all be automatically classified using the term "Jaguar." Unfortunately, a reader interested in one meaning of the term may wind up having to sift through documents pertaining to all of the other meanings as well.

BRIEF DESCRIPTION OF THE DRAWINGS

Various embodiments of the invention are disclosed in the following detailed description and the accompanying drawings.

FIG. 5 illustrates a representation of a data set comprising 25 documents that can be clustered into four clusters (with their topics) and five singletons.

FIG. 6 illustrates the data set after an embodiment of initial clustering has been performed.

FIG. 9B illustrates documents in the data set as members of renovated clusters or as singletons after reclustering.

FIG. 9C illustrates example themes for each of the four clusters using the top shared terms of a given cluster.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
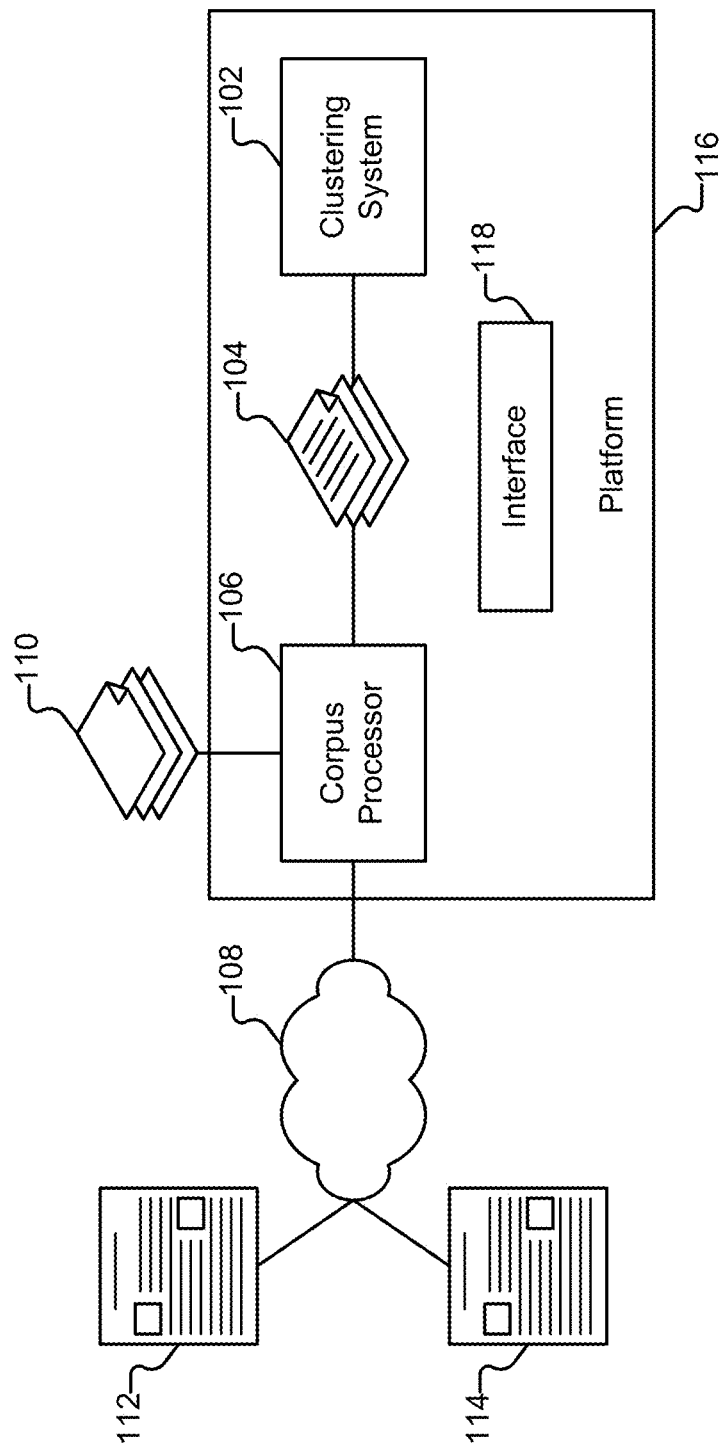
FIG. 1 illustrates an example of an environment in which documents are clustered.

FIG. 1 illustrates an example of an environment in which documents are clustered. Corpus processor 106 is configured to collect (or otherwise receive) documents from a variety of data sources 110-114. Examples of such documents include news articles, forum messages, blog posts, and any other text (in formats such as HTML, TXT, PDF, etc.) as applicable. In the example shown, corpus processor 106 is configured to scrape content from external website 112 and to perform searches using an API made available by search engine 114, both of which are accessible via a network 108 (e.g., the Internet). Corpus processor 106 is also configured to receive documents from an internal source, such as repository 110.

In various embodiments, corpus processor 106 collects documents on demand. For example, a user of platform 116 (hereinafter "Benjamin Snyder," an architect living in California) may initiate a request (via interface 118) for documents that pertain to him. In response to the request, corpus processor 106 obtains documents from one or more of the data sources. Corpus processor 106 can also be configured to store and periodically refresh the documents it collects regarding Benjamin Snyder, such as upon the request of Benjamin Snyder, or programmatically (e.g., once a month).

Corpus processor 106 is configured to process the collected documents and make them available to clustering system 102 as an input data set (104). As one example, in some embodiments corpus processor 106 is configured to convert the documents it receives into plaintext, or otherwise extract text from those documents, as applicable. As will be described in more detail below, clustering system 102 is configured to discover clusters in the input data set and define the theme of each cluster.

Figure 2:
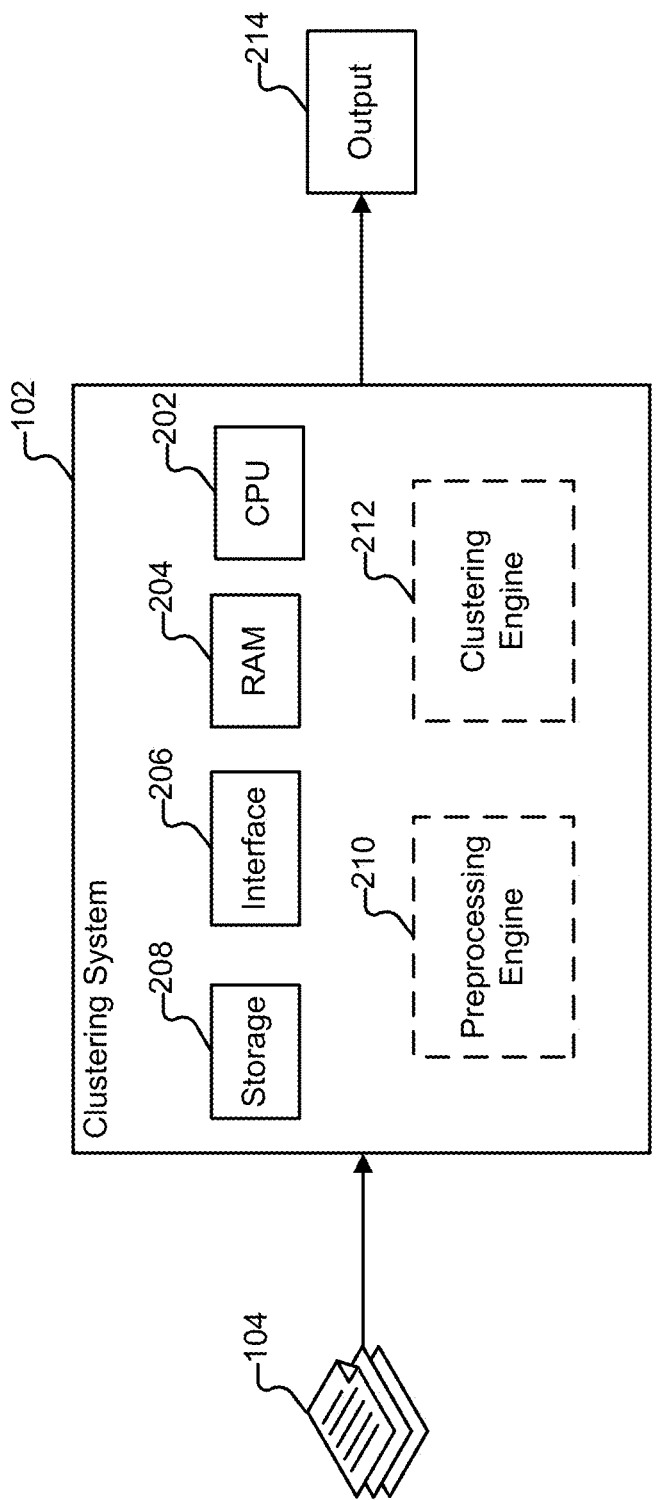
FIG. 2 illustrates an embodiment of a clustering system.

FIG. 2 illustrates an embodiment of a clustering system. In the example shown in FIG. 2, system 102 comprises standard commercially available server hardware (e.g., having a multi-core processor 202, 8G+ of RAM 204, gigabit network interface adaptor(s) 206, and one or more hard drives 208) running a typical server-class operating system (e.g., Linux). In various embodiments, system 102 is implemented across a scalable infrastructure comprising multiple such servers, solid state drives, and/or other applicable high-performance hardware. Further, as illustrated in FIG. 1, clustering system 102 can be collocated on a platform 116 with other components, such as corpus processor 106. Clustering system 102 can also be configured to work with one or more third party elements. For example, the functionality of corpus processor 106 and/or interface 118 can be provided by a third party.

Whenever clustering system 102 is described as performing a task, either a single component or a subset of components or all components of system 102 may cooperate to perform the task. Similarly, whenever a component of system 102 is described as performing a task, a subcomponent may perform the task and/or the component may perform the task in conjunction with other components. In various embodiments, portions of system 102 are provided by one or more separate devices. As one example, the functionality of preprocessing engine 210 and clustering engine 212 may be provided by two different devices, rather than the functionality being provided by a single device. Also, in various embodiments, system 102 provides the functionality of corpus processor 106 and a separate corpus processor is omitted, as applicable.

Clustering system 102 is configured to perform a variety of tasks, including preprocessing (via preprocessing engine 210) and document clustering (via clustering engine 212).

Preprocessing

Clustering system 102 receives as input a set of documents 104 (e.g., from corpus processor 106). Preprocessing engine 210 uses the data set to create a term-by-document matrix M and a keyword list (ordered by column number of M).

A text object (i.e., a document or set of documents) is represented in Latent Semantic Indexing ("LSI") by its term frequency ("TF"). The term frequency representations of two example documents $d_1$ and $d_2$, and of a collection $C_1$ comprising those two documents, are as follows:

$$d_1=[2,0,3,0,0,5,0,1,4]$$

$$d_2=[1,3,0,2,0,3,0,0,3]$$

$$C_1=d_1+d_2=[3,3,3,2,0,8,0,1,7]$$

A concept representation of a text object can also be created, which shows whether the object contains the given term, but does not indicate the number of times the term appears in the document. Using the term frequencies for $d_1$, $d_2$, and $C_1$ above, the concept representations are as follows:

Term Frequency Rep.→Concept Rep.

$$d_1=[2,0,3,0,0,5,0,1,4] \rightarrow b_1=[1,0,1,0,0,1,0,1,1]$$

$$d_2=[1,3,0,2,0,3,0,0,3] \rightarrow b_2=[1,1,0,1,0,1,0,0,1]$$

$$C_1=[3,3,3,2,0,8,0,1,7] \rightarrow B_1=[1,1,1,1,0,1,0,1,1]$$

Suppose the total data set (e.g., received by clustering system 102 as input 104) has $n=N_d$ documents and a vocabulary of $m=N_t$ keywords. Matrix M can be constructed as:

$$M = \begin{bmatrix} d_{11} & \cdots & d_{1m} \\ \vdots & \ddots & \vdots \\ d_{n1} & \cdots & d_{nm} \end{bmatrix}.$$

The keyword list has $N_t$ elements and the order of the keywords in the list matches the order of columns of the TF representation of the documents.

In some embodiments, Matrix M and the keyword list are created as follows: Suppose a total of 50 documents are received as a set 104 by clustering system 102. The documents are stored in a directory of storage 208 as individual files. Preprocessing engine 210 uses a Java program to construct a single file ("doc-file") from the documents in the directory, with each line of the doc-file representing the content of one of the 50 documents. Various rules can be employed to construct the single doc-file, such as by removing email addresses in documents having more than 5,000 characters; truncating documents that are longer than 50,000 characters; and removing any HTML tags or other strings that may erroneously remain after the processing performed by corpus processor 106. Next, the doc-file is used to generate a "mat-file" and a "mat-file.clabel" file by using the doc2mat Perl program. The mat-file includes information about Matrix M and the mat-file.clabel file lists the keywords (e.g., after a tokenization using stemming and ignoring numerical terms is performed). Finally, the mat-file and mat-file.clabel files are read to create the Matrix M and the keyword list using an appropriate Java program. In various embodiments, additional processing is performed when constructing the matrix and keyword list from the mat-file and mat-file.clabel. For example, terms that appear in only a single one of the 50 documents can be omitted.

Clustering

Figure 3:
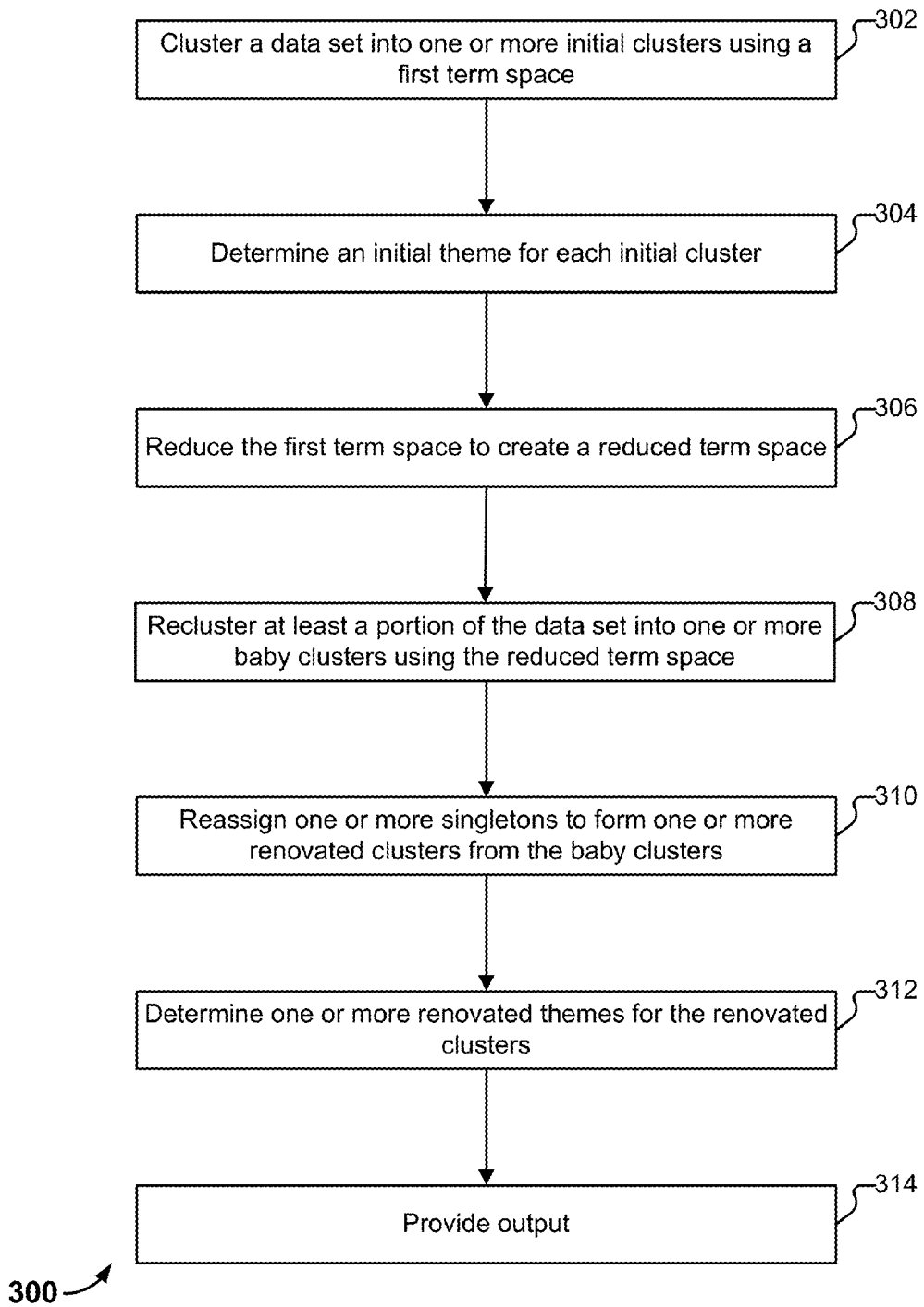
FIG. 3 illustrates an embodiment of a process for clustering documents.

FIG. 3 illustrates an embodiment of a process for clustering documents. In various embodiments the process shown in FIG. 3 is performed by clustering engine 212. In some embodiments clustering engine 212 makes use of industry standard mathematical software tools such as MATLAB, which are installed on or otherwise in communication with system 102.

Initial Clustering

The process begins at 302 when a data set is clustered into one or more initial clusters using a first term set. A variety of clustering techniques can be used and the process described herein adapted as applicable. In some embodiments the clustering is performed using LSI-SVD, as follows. A Matrix $Q_a$ is derived from Matrix M based on the following equation:

$$Q_a = \sqrt{c} D_n^{-1} M,$$

where constant c and matrix $D_n$ are defined as follows:

$$f_i = \sum_{j=1}^{m} (M \cdot M^T)_{ij}, \; g_i = \frac{f_i}{\sum_j f_j}, \; c = \frac{1}{\sum_j f_j}, \; D_n = \text{diag}(\sqrt{g}).$$

Next, singular value decomposition ($[U,S,V]=\text{svd}(Q_a,0)$) is used to obtain and plot the coordinates of terms in a reduced two-dimensional space. Specifically, the coordinates can be derived from the m×m Matrix U:

$$\vec{t}_i=(x_i,y_i), x_i=U(x_i,y_i), y_i=U(i,2), i \in \{1,2,\ldots,m=N_t\}.$$

The angles between terms (term-term angles) are calculated on a unit sphere:

$$\theta_{i,j} = \cos^{-1}\left(\frac{\vec{t}_i \cdot \vec{t}_j}{|\vec{t}_i| \cdot |\vec{t}_j|}\right).$$

For each term $t_i$, a group of closely related terms is built, where an assumption is made that term $t_i$ and $t_j$ are closely related if θ is smaller than a threshold value, for example:

$$\theta_{i,j} < \frac{\pi}{4}.$$

Each group is an m-dimensional concept representation.

Next, LSI-SVD is used to calculate a document-document distance matrix and plot it on a two-dimensional graph. Specifically, a weight Matrix W is built from Matrix M as follows:

$$W_{\mu,i} = \frac{M_{\mu,i} idf_i}{\sqrt{W_\mu}}, \; W_\mu = \sum_{i=1}^{m}(M_{\mu,i} idf_i)^2, \; idf = \log\left(\frac{n}{n_i}\right), \; n_i = \sum_{\mu=1}^{n} M_{\mu,i}.$$

Singular value decomposition ([U,S,V]=svd($W^T$,0)) is used to obtain and plot the coordinates of documents in a reduced two-dimensional space. Specifically, the coordinates can be derived from the n×n Matrix V:

$$\vec{d}_\mu=(x_\mu,y_\mu), x_\mu=V(\mu,1), y_\mu=V(\mu,2), \mu \in \{1,2,\ldots,n\}.$$

The distances between documents ("ddDist") are calculated as follows:

$$\text{dist}(d_\mu, d_\nu) = |\vec{d}_\mu - \vec{d}_\nu|.$$

Finally, cluster membership is determined, using the assumption that a document belongs to a cluster (referred to as an "initial cluster" at this stage of processing) if its distance from at least one document in the cluster is less than a threshold value. In some embodiments the threshold value is an optimized radius. For example, it may be estimated as: $\rho = \kappa \times \sigma(\min \text{DistMin}, \max \text{DistMin})$, where $\kappa$ is a parameter based on the size of the dataset (for example, $\kappa=3.5$ for entity datasets), and $\sigma(\min \text{DistMin}, \max \text{DistMin})$ is an empirical function derived from the best fitting for several small datasets using the minimum and maximum of the minimum distances between documents. Documents that do not belong to any clusters are left as singletons.

At 304, a theme of each initial cluster is determined by a set of keywords. One way of determining themes is as follows. First, a set of core terms is calculated for each of the initial clusters, using the following three cases:

Case 1: Use the original terms shared by all documents in the cluster. (This case will likely apply to sets with hundreds of terms per document, or more.)

Case 2: If no terms are found in Case 1, add connected terms which are closely related to the terms in the documents, e.g., in accordance with the definition of "closely related" above. (This may be required for some small data sets.)

Case 3: If no terms are found in Case 2, use the union of the terms of all documents in the cluster. (This may be required for some very small data sets.)

Next, the concept of the cluster is calculated as the union of the core terms of the cluster and any terms closely related to those terms.

Finally, a theme representation of the entire data set is determined as follows. A term frequency representation ("clusterTF") is constructed for each cluster in accordance with rules, such as the following: (1) the term is not shared by all cluster concepts; (2) the term is contained by at least one document in the clusters; and (3) the total term frequency of the term is not less than a threshold value "tfMin." The concept shared by all clusters (i.e., the "theme" of the dataset) and the "theme" of each cluster, defined by the top "tfMax" (a threshold value, set to 12 by default) frequent terms based on the cluster term frequency representation are displayed.

For very small data sets, the processing performed at 302-304 of process 300 may be sufficient to achieve satisfactory clusters and theme representations. However, for more typical data sets, the existence of noise terms obscures clusters. As will now be described, renovated clusters, using a reduced term space in which noise terms are excluded, can be used to improve clustering results.

Reduced Term Space

At 306, the term space is reduced. One approach for reducing the term space is as follows. Suppose a term frequency representation for each cluster ("clusterTF") has already been created, as described above. A reduced term space can be constructed by keeping in the term space only those terms in the clusterTFs.

Renovated Clustering

At 308, the data set is reclustered into one or more baby clusters using the reduced term space. In some embodiments, the same clustering techniques employed at 302 are used again at 308. In other embodiments, an alternate clustering technique is used. One example of such an alternate technique will now be described.

First, a new document term frequency Matrix $M_2$ and keyword list with a reduced term space of dimension m'<m are built. Instead of using singular value decomposition, for the second round of clustering a vector space model (VSM) is used to define relations of documents. The coordinates of documents are found this time using a weight Matrix W built from Matrix $M_2$ as follows:

$$w_{\mu,i} = \frac{tf_{\mu,i} idf_i}{\sqrt{W_\mu}}, \; W_\mu = \sum_{i=1}^{m'}(tf_{\mu,i} \times idf_i)^2.$$

A variety of different weight formulae can be used—the preceding is provided merely as an example. Next, a document-document relevance coefficient ("ddRC") is calculated based on the calculated weights, together with a minimum and maximum:

$$RC(d_\mu, d_\nu) = \sum_{i=1}^{m'} w_{\mu,i} w_{\nu,i}.$$

A document is assumed to belong to a cluster if its relevance coefficient ("RC") with one of the documents in the cluster is greater than the value of "rcMin." In some embodiments, rcMin is 0.45. Using such a value for rcMin will typically result in small clusters (also referred to herein as "baby clusters") and several singletons (illustrated in FIG. 4A).

Reassigning Singletons

At 310, an attempt is made to reassign singletons to the baby clusters. One approach to performing this assignment is as follows: A singleton will be assigned to a given cluster if (1) the RC with that cluster is greater than its RC with any other cluster; and (2) the RC is greater than a minimum threshold value "rcS." In some embodiments, rcS=0.05 by default.

The RC between a document $d_\mu$ and a cluster $c_\alpha$ is calculated as:

$$RC(d_\mu, c_\alpha) = \sum_{i=1}^{m'} w_{\mu,i} \frac{tf_{\alpha,i}}{W_\alpha}, \; W_\alpha = \sqrt{\sum_{i=1}^{m'} tf_{\alpha,i}^2}.$$

Figure 4B:
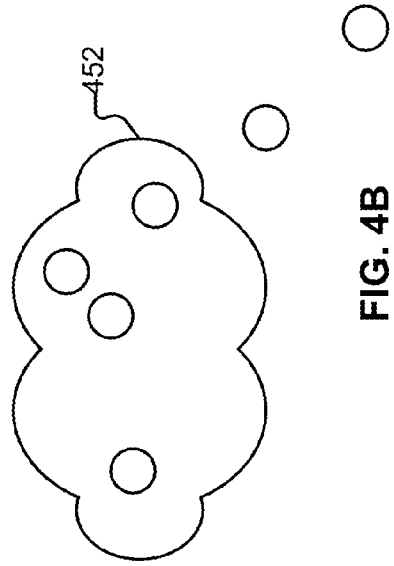
FIG. 4B is a conceptual illustration of reclustering (after moving the singletons to the baby clusters).
Figure 4B:
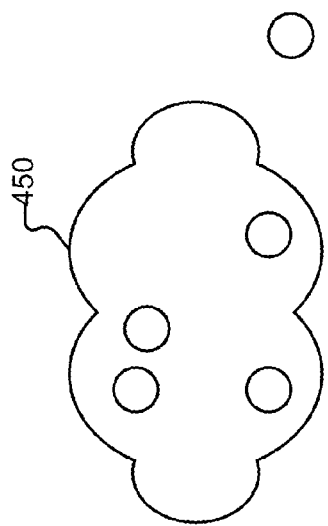
Figure 4A:
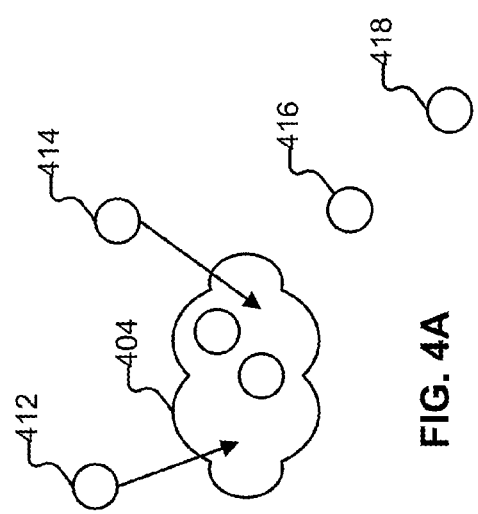
FIG. 4A is a conceptual illustration of baby clusters and singletons.
Figure 4A:
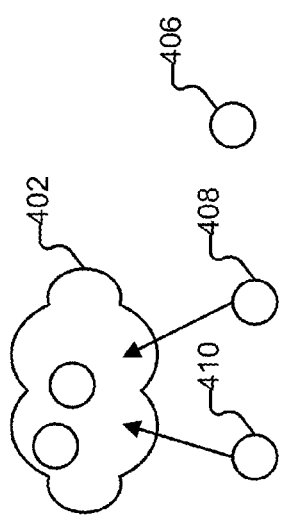

The reassignment of singletons is conceptually illustrated in FIGS. 4A and 4B. Specifically, as shown in FIG. 4A, baby cluster 402 and baby cluster 404 each include two documents. Seven singletons (406-418) are present. The relevance (or closeness) of a singleton to each cluster is calculated. Singletons 410 and 408, and singletons 412 and 414 are respectively close enough to baby clusters 402 and 404 that they will be reassigned to those clusters (as indicated by arrows in FIG. 4A).

As illustrated in FIG. 4B, singletons 408, 410, 412, and 414 can be reassigned in compliance with the reassigning rules described above. The resulting clusters (i.e. baby clusters combined with any reassigned singletons) are referred to herein as "renovated clusters" 450 and 452.

At 312, renovated themes are determined for the renovated clusters. In various embodiments, the processing performed at 312 is the same as the processing preformed at 304.

Output

Finally, at 314 the renovated themes, renovated clusters (including any reassigned singletons), and/or any remaining singletons are provided as output 214, as applicable. The output of process 300 can be used in a variety of contexts, examples of which are described below.

System 102 can be used to help the Benjamin Snyder mentioned in conjunction with FIG. 1 to differentiate documents that are about him from other documents about other Benjamin Snyders. Documents about the user Benjamin Snyder will be clustered together and have as a theme terms such as "architect" and "California." Documents about the other Benjamin Snyders will also be in their own respective clusters and have other themes, such as "basketball player"/"Kentucky" or "dentist"/"New York," which do not describe the user.

As another example, a celebrity that may be commonly mentioned in news articles can use system 102 to receive news alerts about one aspect of the celebrity's life (e.g., film-making or parenting) and selectively ignore information about other aspects (e.g., a failed musical career). In this scenario, the input set could be generated as a result of a search for the celebrity on site 114, with the results being automatically clustered into the various themes.

As yet another example, a user of platform 116 can perform a search for documents residing on data source 110 pertaining to "jaguars," and receive back results clustered based on the various disambiguations of the term.

In various embodiments, output 214 is provided to other processes, in addition to or instead of being displayed to a human user. For example, in the case of the celebrity described above, sentiment analysis can be performed by another component of platform 116 to assign scores to the distinct aspects of the celebrity's life (as determined from the clusters). In such a scenario, the celebrity might learn that articles mentioning the celebrity's film-making attempts are 70% positive, while articles mentioning the musical career are 25% positive.

EXAMPLE

"Star" Data Set

FIGS. 5-9C and the accompanying text illustrate portions of process 300 as applied to an example set of data. Specifically, suppose a search of data source 114 is performed by corpus processor 106 using the term "star" and that the first 25 results are processed by corpus processor 106 and provided to clustering system 102. The 25 documents collectively include a total of 4215 terms. Four different topics are represented in the data (each having five documents) and five documents are singletons, as illustrated in FIG. 5. When terms that occur in only a single one of the 25 documents are removed, a total of 1074 terms remain as the initial term space.

Initial Clustering

Figure 7:
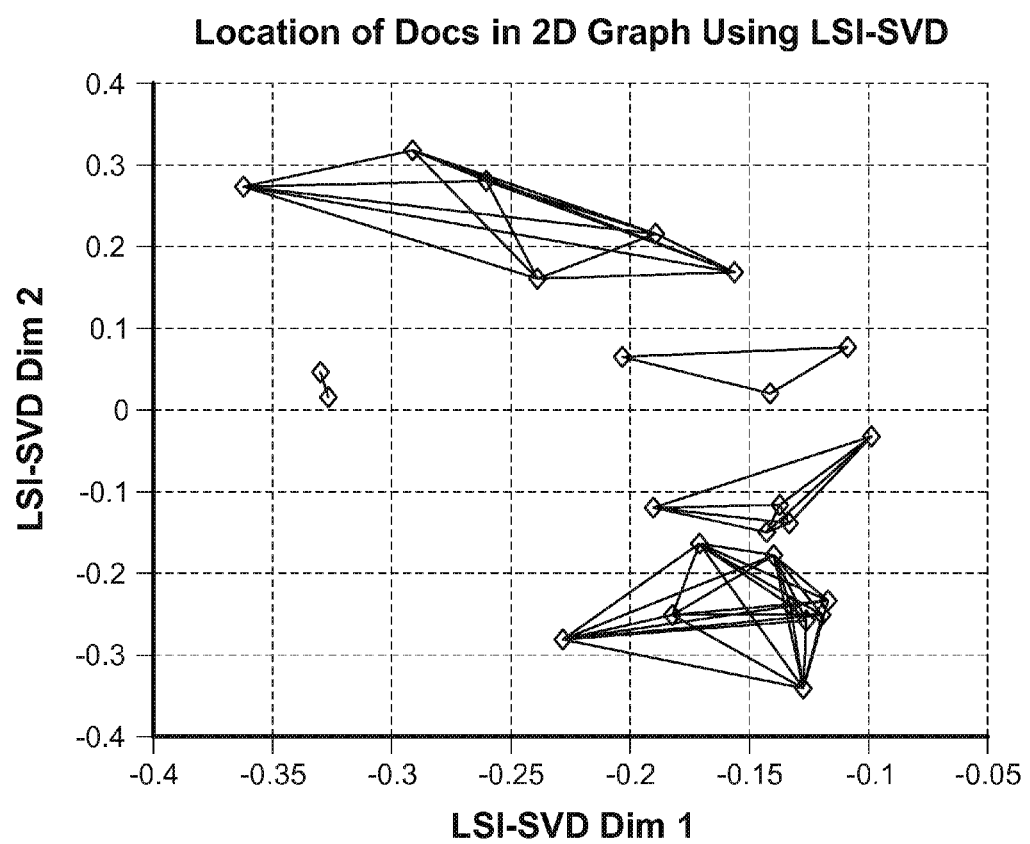
FIG. 7 illustrates a graphical view of initial clustering of the data set.

Using singular value decomposition for term-term interaction and LSI-SVD for document-document interaction, with K=4.5, the initial clusters (and no singletons) depicted in FIG. 6 are obtained. The theme of the data set is determined to be "star," as it is the shared, connected term with the highest frequency. When a tfMin=8 and tfMax=10 are used to build a term frequency representation and generate themes, it can be seen that a total of eleven of the documents are misplaced. Some of the clusters are virtually correct (e.g., cluster 602 compared to 502). Other clusters are over inclusive (604) with no clear theme, and yet others are under inclusive (e.g., cluster 606 compared to 504). Moreover, there are no singletons. FIG. 7 illustrates the star data set, in two-dimensions, after initial clustering has been performed.

Reducing Term Space and Re-Clustering

Figure 8:
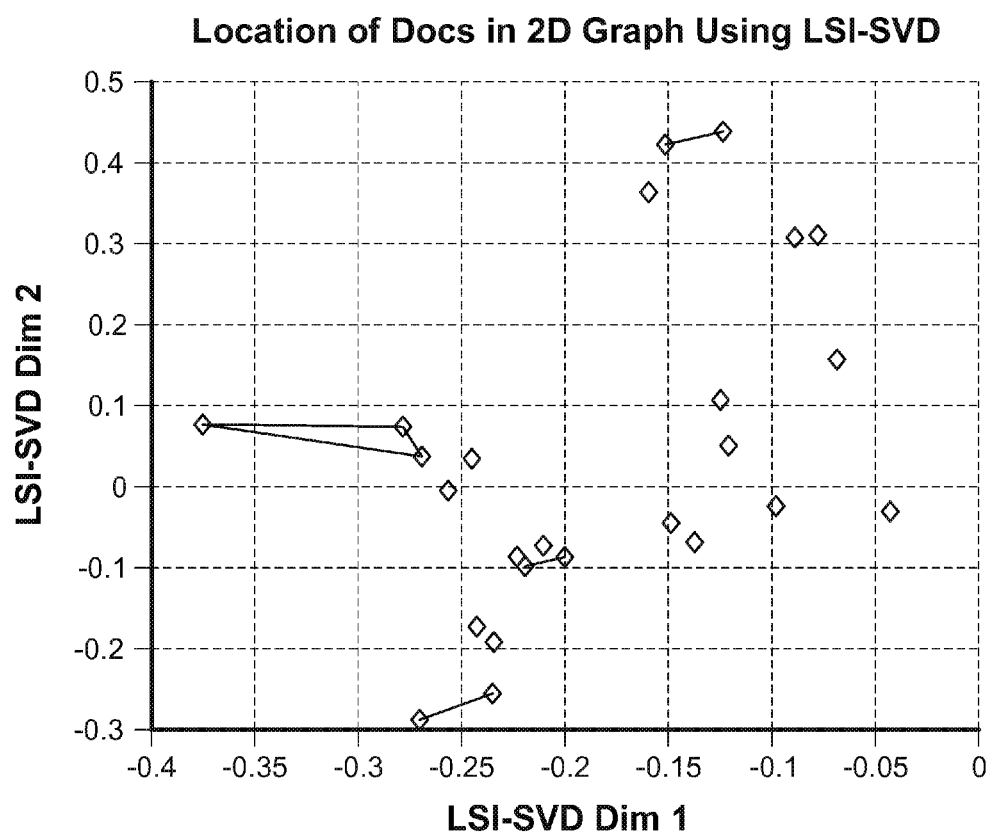
FIG. 8 illustrates a graphical view of baby clusters and singletons.

Using the clustering term frequency representations obtained in initial clustering, a new matrix and keyword list using the reduced term space is generated. At this point, the dimension of the keyword list is now 93. Reclustering is performed using VSM with an rcMin=0.45 and, as illustrated in FIG. 8, four baby clusters (with lines connecting their member documents) and 16 singletons are found. The baby clusters are small, but are well defined and usable as cluster seeds when reassigning singletons.

Reassigning Singletons

Figure 9A:
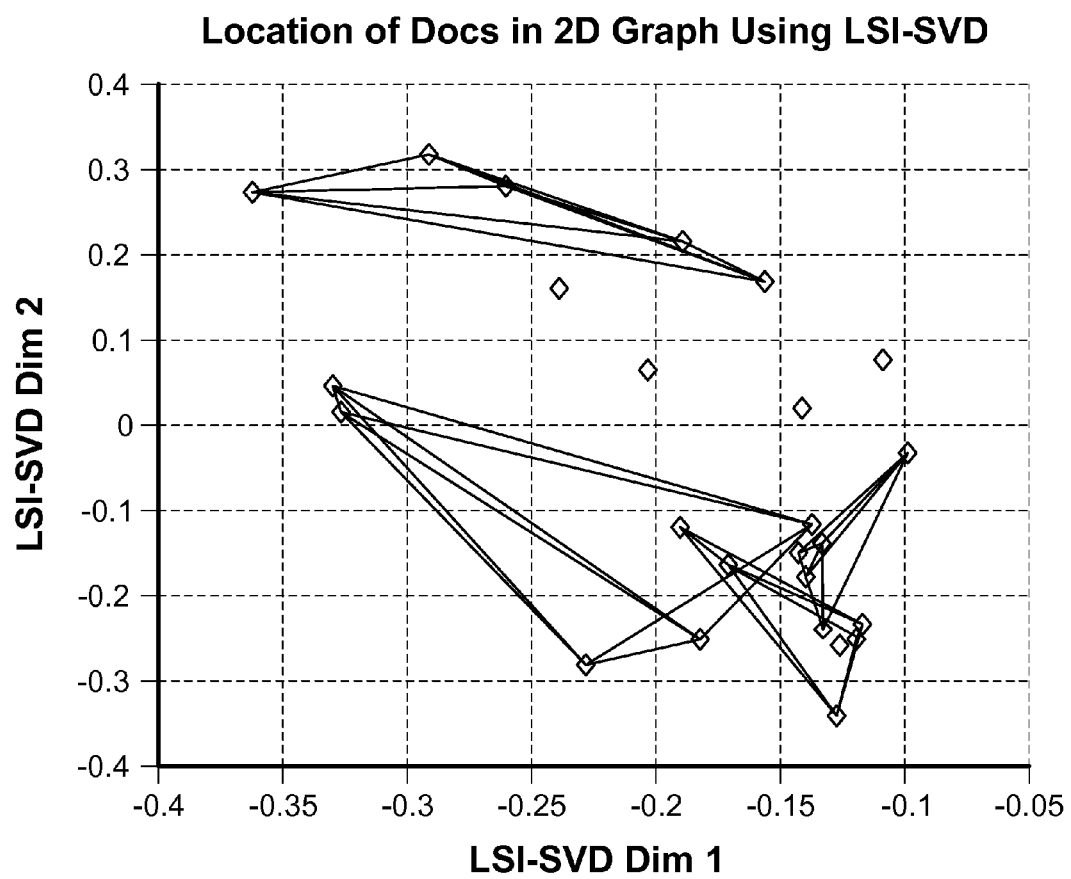
FIG. 9A illustrates a graphical view of clusters after reassigning singletons is performed.

Finally, singletons are reassigned by calculating its RC with each cluster (as in VSM) and keeping the document as a singleton if the max RC<rcS. (Shown in FIG. 9A). In the final output, only three of the 25 documents are misplaced (indicated with underlining) in FIG. 9B. In addition, each cluster has a clear theme, as shown in FIG. 9C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
cluster a data set into one or more initial clusters using a first term space comprising a plurality of keywords;
determine an initial theme for each initial cluster, wherein the initial theme for each initial cluster is determined based on at least one keyword in the first term space;
reduce the first term space to create a reduced term space, wherein reducing the first term space includes removing from the first term space a keyword term that is determined to be present in a first document clustered into a first initial cluster and is also determined to be present in a second document clustered into a second initial cluster, and wherein a term frequency for the keyword at least meets a predetermined threshold;
recluster at least a portion of the data set into one or more baby clusters using the reduced term space, wherein after reclustering, at least one singleton is present, wherein a singleton is an element from the data set that was not assigned to any baby clusters during the reclustering;
assign at least one singleton to a baby cluster to form one or more renovated clusters;
determine a renovated theme for at least one of the renovated clusters; and provide as output one or more of the renovated clusters and their respective themes; and a memory coupled to the processor and configured to provide the processor with instructions.

2. The system of claim 1 wherein a first renovated theme for a first renovated cluster comprises one or more frequent keywords that are uniquely associated with the first renovated cluster.

3. The system of claim 1 wherein the processor is configured to cluster the data set into the one or more initial clusters at least in part by using singular value decomposition on a keyword-by-document matrix and wherein the processor is configured to recluster at least in part by using a vector space model.

4. The system of claim 1 wherein the data set includes entity data.

5. The system of claim 1 wherein the processor is configured to recluster at least in part by:
using a first relevance criterion to generate a set of baby clusters and a set of singletons; and
using a second relevance criterion to assign at least one singleton included in the set of singletons to a baby cluster included in the set of baby clusters, wherein the first and second relevance criteria are different.

6. The system of claim 1 wherein the processor is further configured to preprocess the data set at least in part by generating a keyword-by-document matrix.

7. The system of claim 1 wherein the processor is further configured to preprocess the data set at least in part by generating the first term space.

8. The system of claim 7 wherein the data set comprises a plurality of documents and wherein the processor is configured to generate the first term space at least in part by evaluating keywords present in the data set and not include in the first term space a solo keyword that occurs solely in a single document included in the plurality of documents.

9. The system of claim 7 wherein the processor is configured to generate the first term space at least in part by evaluating keywords present in the data set and not include in the first term space one or more keywords associated with numbers.

10. The system of claim 1 wherein at least some of the data included in the data set describes a first individual, wherein at least some of the data included in the data set describes a second individual, and wherein the output is provided to the first individual.

11. A method, comprising:
clustering a data set into one or more initial clusters using a first term space comprising a plurality of keywords;
determining an initial theme for each initial cluster, wherein the initial theme for each initial cluster is determined based on at least one keyword in the first term space;
reducing the first term space to create a reduced term space, wherein reducing the first term space includes removing from the first term space a keyword that is determined to be present in a first document clustered into a first initial cluster and is also determined to be present in a second document clustered into a second initial cluster, and wherein a term frequency for the keyword at least meets a predetermined threshold;
reclustering at least a portion of the data set into one or more baby clusters using the reduced term space, wherein after reclustering, at least one singleton is present, wherein a singleton is an element from the data set that was not assigned to any baby clusters during the reclustering;
assigning at least one singleton to a baby cluster to form one or more renovated clusters;
determining a renovated theme for at least one of the renovated clusters; and
providing as output one or more of the renovated clusters with their respective themes.

12. A computer program product embodied in a non-transitory computer readable storage medium and comprising computer instructions for:
clustering a data set into one or more initial clusters using a first term space comprising a plurality of keywords;
determining an initial theme for each initial cluster, wherein the initial theme for each initial cluster is determined based on at least one keyword in the first term space;
reducing the first term space to create a reduced term space, wherein reducing the first term space includes removing from the first term space a keyword term that is determined to be present in a first document clustered into a first initial cluster and is also determined to be present in a second document clustered into a second initial cluster, and wherein a term frequency for the keyword at least meets a predetermined threshold;
reclustering at least a portion of the data set into one or more baby clusters using the reduced term space, wherein after reclustering, at least one singleton is present, wherein a singleton is an element from the data set that was not assigned to any baby clusters during the reclustering;
assigning at least one singleton to a baby cluster to form one or more renovated clusters;
determining a renovated theme for at least one of the renovated clusters; and
providing as output one or more of the renovated clusters and their respective themes.

13. The system of claim 1 wherein the processor is further configured to:
determine a theme for at least one baby cluster or singleton that was not included in any renovated clusters during the assignment; and
provide as output one or more of the baby clusters or singletons for which a theme was determined, and the determined theme.

14. The method of claim 11 wherein a first renovated theme for a first renovated cluster comprises one or more frequent keywords that are uniquely associated with the first renovated cluster.

15. The method of claim 11 wherein clustering the data set into the one or more initial clusters includes using singular value decomposition on a keyword-by-document matrix and wherein reclustering includes using a vector space model.

16. The method of claim 11 wherein reclustering includes:
using a first relevance criterion to generate a set of baby clusters and a set of singletons; and
using a second relevance criterion to assign at least one singleton included in the set of singletons to a baby cluster included in the set of baby clusters, wherein the first and second relevance criteria are different.

17. The method of claim 11 further comprising preprocessing the data set at least in part by generating a keyword-by-document matrix.

18. The method of claim 11 further comprising preprocessing the data set at least in part by generating the first term space.

19. The method of claim 18 wherein the data set comprises a plurality of documents and wherein generating the first term space includes evaluating keywords terms present in the data set and not including in the first term space a solo term keyword that occurs solely in a single document included in the plurality of documents.

20. The method of claim 18 generating the first term space includes evaluating keywords present in the data set and not including in the first term space one or more keywords associated with numbers.

* * * * *